(12) United States Patent
Sole et al.

(10) Patent No.: US 9,788,140 B2
(45) Date of Patent: Oct. 10, 2017

(54) TIME TO PLAY

(71) Applicant: QUALCOMM TECHNOLOGIES INTERNATIONAL, LTD., Cambridge (GB)

(72) Inventors: Jonathon Sole, Cambridge (GB); Benjamin Campbell, Bury St Edmunds (GB); Harith Haboubi, Cambridge (GB)

(73) Assignee: QUALCOMM TECHNOLOGIES INTERNATIONAL, LTD., Cambridge (GB)

( * ) Notice: Subject to any disclaimer, the term of this patent is extended or adjusted under 35 U.S.C. 154(b) by 0 days.

(21) Appl. No.: 14/587,792

(22) Filed: Dec. 31, 2014

(65) Prior Publication Data

US 2016/0192114 A1    Jun. 30, 2016

(51) Int. Cl.
| | |
|---|---|
| *H04H 40/00* | (2009.01) |
| *H04W 4/00* | (2009.01) |
| *H04W 72/00* | (2009.01) |
| *H04W 76/02* | (2009.01) |
| *H04L 29/06* | (2006.01) |
| *H04N 21/43* | (2011.01) |
| *H04B 7/00* | (2006.01) |
| *H04N 21/4363* | (2011.01) |

(52) U.S. Cl.
CPC ......... *H04W 4/008* (2013.01); *H04L 65/4076* (2013.01); *H04L 65/60* (2013.01); *H04L 65/608* (2013.01); *H04L 65/80* (2013.01); *H04N 21/4305* (2013.01); *H04W 72/005* (2013.01); *H04W 76/023* (2013.01); *H04N 21/43637* (2013.01)

(58) Field of Classification Search
CPC ............... H04W 4/008; H04W 72/005; H04W 76/023; H04H 2201/11; H04H 2201/20
USPC ...................... 455/41.2, 41.3, 3.06
See application file for complete search history.

(56) References Cited

U.S. PATENT DOCUMENTS

| | | | | |
|---|---|---|---|---|
| 5,945,948 | A | * | 8/1999 | Buford .................... G01S 5/021 342/457 |
| 9,338,715 | B1 | * | 5/2016 | Sevindik ............. H04W 76/002 |
| 2005/0201335 | A1 | * | 9/2005 | Fernandez-Corbaton ........................ H04W 56/0005 370/335 |

(Continued)

FOREIGN PATENT DOCUMENTS

EP    1398931 A1    3/2004

OTHER PUBLICATIONS

International Search Report and Written Opinion—PCT/US2015/059603—ISA/EPO—Mar. 4, 2016.

*Primary Examiner* — Ayodeji Ayotunde
(74) *Attorney, Agent, or Firm* — The Marbury Law Group, PLLC (57) ABSTRACT

A device capable of operating according to a wireless communications protocol, the device being configured to: receive media data from one of a plurality of inputs; determine an offset period of time in dependence on which one of the plurality of inputs the media data is received from; determine a time for playing the received media data in dependence on the determined offset period and a clock value; encapsulate the media data and time data representing the determined time in a broadcast packet; and broadcast the packet in accordance with the wireless communications protocol.

29 Claims, 4 Drawing Sheets

(56) References Cited

U.S. PATENT DOCUMENTS

| | | | |
|---|---|---|---|
| 2007/0160225 A1* | 7/2007 | Seydoux | H04W 8/005 |
| | | | 381/79 |
| 2008/0031220 A1* | 2/2008 | Li | H04L 7/0054 |
| | | | 370/350 |
| 2008/0291863 A1* | 11/2008 | Agren | H04J 3/0632 |
| | | | 370/315 |
| 2009/0298420 A1* | 12/2009 | Haartsen | H04J 3/0658 |
| | | | 455/3.06 |

* cited by examiner

TIME TO PLAY

FIELD OF THE INVENTION

This invention relates to synchronously controlling the playback of media at multiple devices.

BACKGROUND

The ability to communicate data wirelessly has led to many new and improved applications and devices. Some systems which traditionally were wired are now being improved by replacing the wires with wireless capabilities. For example, traditional 5.1 surround sound systems require 6 speakers to be located in different parts of a room and to be wired to a central receiver. Many users have found that the cabling required to install such a system to be very inconvenient and cumbersome. Thus multi-speaker systems have been provided with wireless capability which allows users to easily install and use the systems.

Some wireless multi-speaker systems employ a hub which is wirelessly connected to the speakers in the system. The hub can store a user's music collection and can wirelessly send the stored music for playback to the speakers in the system. A user can select the music to be output by the speakers via, for example, a user interface on the hub or a device connected to the hub.

Typically such systems employing a hub operate in a proprietary network. Such a proprietary system provides the proprietor with flexibility, control and freedom to implement different functions with their proprietary devices. However, a problem with such proprietary systems is that they may not be compatible with devices from other vendors. This can restrict other vendors from manufacturing devices (such as additional speakers or media sources) for use in the wireless speaker system and thus also restricts consumer choice. Furthermore, the user of such a system is restricted to playing music that is stored at the hub. This restriction means that music stored elsewhere (e.g. in the cloud, at a streaming server, etc.) cannot quickly and easily be played back by the proprietary system. There is therefore a need for a technique of flexibly playing media at a multitude of devices in a synchronised manner.

SUMMARY OF THE INVENTION

According to one aspect, there is provided a device capable of operating according to a wireless communications protocol, the device being configured to: receive media data from one of a plurality of inputs; determine an offset period of time in dependence on which one of the plurality of inputs the media data is received from; determine a time for playing the received media data in dependence on the determined offset period and a clock value; encapsulate the media data and time data representing the determined time in a broadcast packet; and broadcast the packet in accordance with the wireless communications protocol.

The plurality of inputs may comprise a first input and a second input, wherein the determined offset period is a first time period if the media data is received from the first input and the determined offset period is a second time period if the media data is received from the second input, the first time period being different to the second time period. The first input may be burstier than the second input and the first time period may be greater than the second time period.

The time for playing may be determined in dependence on a sample rate at which media data is received.

The offset time may be determined in dependence on a first estimated period of time for processing the media data for playback and a second estimated period of time for processing the media data for broadcasting. The time may be determined further in dependence on a third estimated period of time for receiving the broadcasted packet at another device and a fourth estimated period of time for processing received packet for playing back the media data.

A sequence number for the media data may be represented by the time data.

The received media may be encoded according to a first codec, the device being further configured to: decode the received media data; temporarily store the decoded media data and time data in a buffer; encode the stored media data according to a second codec different to the first codec, wherein the encapsulated media data is the encoded media data; and play the stored decoded media data at the determined time.

The device may comprise a playback device configured to receive the media data and the time data and play the media data at the time indicated by the time data.

The broadcast may be unidirectional.

The wireless communications protocol may mandate that receiving devices receiving broadcasted packets do not send acknowledgement messages to confirm receipt of the broadcasted packets.

The wireless communications protocol may be Bluetooth. The broadcast may be a connectionless slave broadcast.

The media may be received via an A2DP link of the Bluetooth communications protocol.

The device may be further configured to encapsulate control data in the broadcast packet, wherein the control data is configured to cause a receiving device to perform a control function at a time indicated by the time data.

According to another aspect, there is provided a device capable of operating according to a wireless communications protocol, the device being configured to: receive a broadcast packet broadcasted in accordance with the wireless communications protocol, wherein the broadcast packet comprises media data and time data; decode the media data; determine a time for playing the decoded media data in dependence on the time data and a clock; and play the decoded media data at the determined time.

The broadcast packet may be received from a hub using a link defined by the wireless communication protocol, the device being configured to not transmit packets to the hub using the link.

According to yet another aspect, there is provided a method of broadcasting a stream of packet comprising: receiving a stream of media frames from one of a plurality of inputs; determining an offset period of time in dependence on which one of the plurality of inputs the media frames are received from; determining a time for playing each of the received media frames in dependence on the determined offset period and a clock; broadcasting a stream of packets comprising media frames and the determined time for playing for each frame in accordance with a wireless communications protocol; and playing each media frame of the broadcasted stream at the determined time at a plurality of devices.

The wireless communications protocol may be a Bluetooth protocol and the stream may be broadcast in the connectionless slave broadcast mode of the Bluetooth protocol.

BRIEF DESCRIPTION OF THE DRAWINGS

The present invention will now be described by way of example with reference to the drawings. In the drawings.

DETAILED DESCRIPTION

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The following describes wireless communication devices for broadcasting data and receiving that broadcasted data. That data is described herein as being transmitted in packets and/or frames and/or messages. This terminology is used for convenience and ease of description. Packets, frames and messages have different formats in different communications protocols. Some communications protocols use different terminology. Thus, it will be understood that the terms "packet" and "frame" and "messages" are used herein to denote any signal, data or message transmitted over the network.

Figure 1:
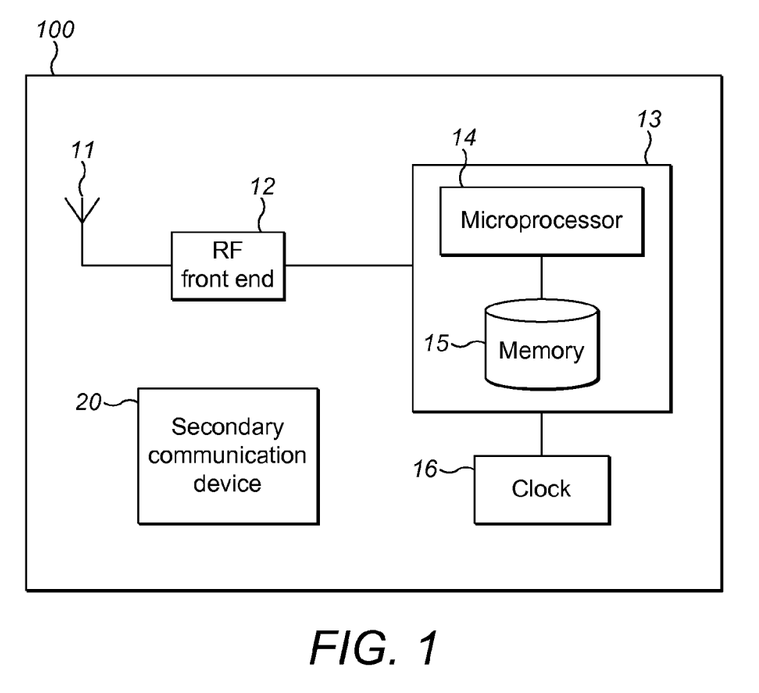
FIG. 1 illustrates a wireless communication device.

FIG. 1 shows the architecture of a wireless communication device 100 capable of operating according to a communication protocol. The device 100 comprises an antenna 11, a radio frequency (RF) front end 12 and a baseband processor 13. The baseband processor 13 comprises a microprocessor 14 and a non-volatile memory 15. The non-volatile memory 15 stores in non-transitory form program code that is executable by the microprocessor to cause the baseband processor to implement the communications protocol of the device and the methods described herein.

In order to transmit signals the processor 13 can drive the RF front end 12, which in turn causes the antenna 11 to emit suitable RF signals. Signals received at the antenna 11 can be pre-processed (e.g. by analogue filtering and amplification) by the RF front end 12, which presents corresponding signals to the processor 13 for decoding. The processor can respond to those signals in various ways, as will be described in more detail below. The device 100 also comprises a clock 16, which can be turned on or off by the microprocessor 14 in order to save power. The RF front end 12 and the baseband processor 13 could be implemented on one or more integrated circuits.

In the case that the device 100 operates according to two or more communications protocols, it may have separate transceiver circuitry for each communications protocol, in which case the device of FIG. 1 would additionally have a further antenna, RF front end and baseband processor for each communications protocol that it supports. Alternatively, one or more of the antenna, RF front end and baseband processor may be shared by two or more of the communications protocols that the device is configured to communicate with. FIG. 1 shows a secondary communication device 20 to illustrate support for a second communication protocol. In an example, device 10 may be based on the Bluetooth protocol (e.g. Bluetooth Low Energy). Examples of the protocols that could be supported by the secondary device 20 include protocols such as IEEE 802.11, Ethernet, USB, DAB, etc.

The Bluetooth communications protocol is commonly used for many wireless applications between portable and computing devices and the like. It is increasingly being used in domestic applications for functions such as streaming or playing back audio and/or video data and other multi-media applications such as gaming using portable gaming devices. The methods and devices described below will be described with reference to devices that can operate in accordance with a Bluetooth communications protocol. The general principles described below can be applied to devices and systems operating according to other communications protocols such as Wi-Fi, Zigbee, etc.

Figure 2:
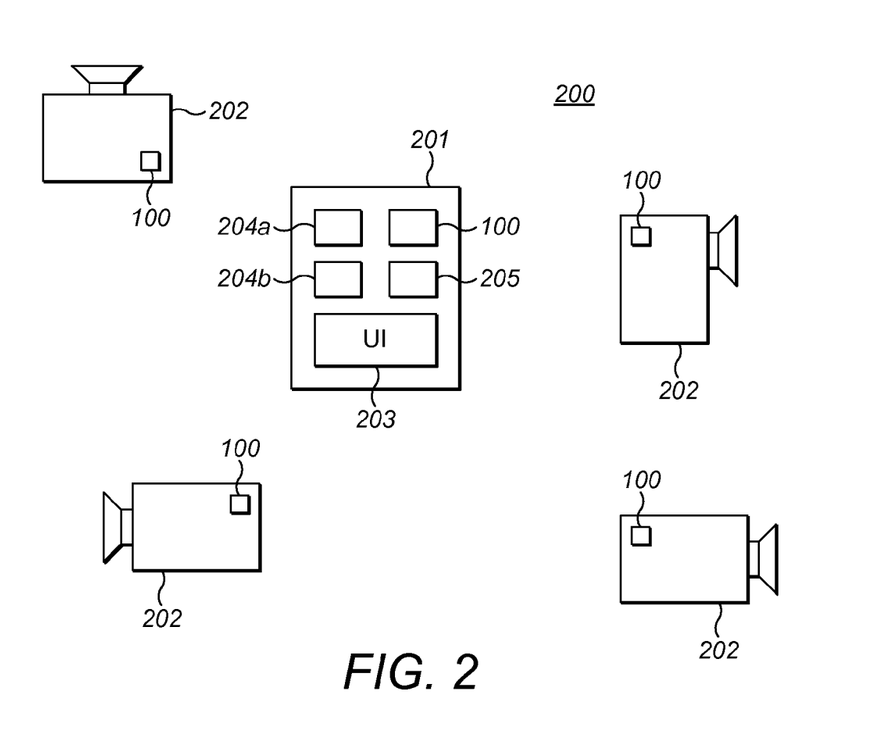
FIG. 2 illustrates a wireless speaker system

FIG. 2 shows an example of a multi-speaker system 200. The system 200 comprises a hub device 201 and one or more remote devices 202. The hub device 201 and the remote devices 202 each comprise a wireless communication device (such as device 100) that operates according a wireless communications protocol (e.g. Bluetooth).

The hub device 201 comprises a plurality of inputs 204a and 204b for receiving media data. Although only two inputs 204a and 204b are shown, device 204 may be provided with many more inputs. Each input 204a/b may be a wired or wireless interface such as USB, analogue line-in, I2S, S/PDIF, Bluetooth, Ethernet, Wi-Fi, the wireless communication device 100, DAB, etc. Input 204a may be the same or a different type of interface as input 204b. Each input 204a/b may receive media from one or more media sources (not shown). A media source may be, for example, an internal storage device (e.g. flash memory, hard disk), a removable storage device (e.g. memory card, CD), a networked storage device (e.g. network drive or the cloud), an internet media provider (e.g. a streaming service), radio (e.g. DAB), a microphone, etc. The hub device 201 may be, for example, a smartphone, tablet, PC, laptop, smartwatch, smart glasses, speaker, smart TV, AV receiver, mixer, games console, games controller, media hub, set-top box, Hi-Fi, etc.

Each remote device 202 (and, optionally, the hub device 201) comprises (or is connected to) a media output such as a speaker, display, vibration feedback motor, etc. for playing media. Speakers are depicted in FIG. 2 as an example. The media output may be connected to the wireless communication device 100 and/or a media source to receive media for playback. The example of FIG. 2 shows four remote devices 202. However, many more remote devices 202 (e.g. tens, hundreds, even thousands) can be added to the system 200, as will be explained below. The remote devices 202 may be, for example, stand-alone speakers or displays or integrated into other devices such as smartphones, TVs, docking stations, Hi-Fis, smart watches, smart glasses, virtual reality headsets, etc.

The hub device 201 may comprise a user interface (UI) 203. The user interface 203 may be, for example, a touch screen, one or more buttons, a games controller, a remote control, a microphone for receiving voice commands, a camera for receiving user gestures, a peripheral device such as a mouse, etc. The user interface 203 allows a user to select and control (e.g. start, pause, adjust volume level, etc.) the media that is to be played back by the remote devices 202 (and the hub device, if provided with a media output). Alternatively or additionally, user commands made on a user interface on another device may be communicated to the hub device 201. For example, user commands may be sent to the hub device 201 from an application running on a smartphone. In another example, the hub device 201 may have a preconfigured role and plays and broadcasts media according to that preconfigured role (e.g. this may be the case where the hub device is a sub-woofer in a 5.1 surround sound system). The media selected for playback by the user may be received via one of the inputs, e.g. 204a. A user may then select other media for playback, which may be received via one of the other inputs, e.g. 204b.

Figure 3:
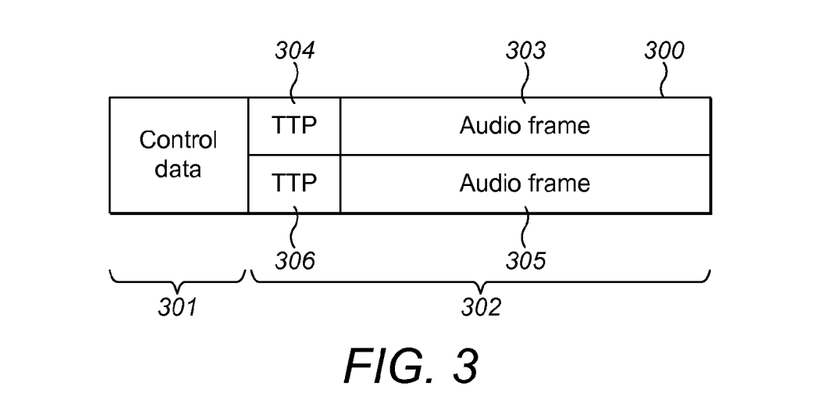
FIG. 3 illustrates a packet format for the wireless speaker system.

The media received via the inputs 204a/b may be processed by the hub device 201 and broadcasted. The broadcast can be received by as many remote devices 202 within the coverage area of the hub device. FIG. 3 shows an example structure of a broadcast packet 300. The broadcast packet 300 comprises a section 301 for control data and a section 302 for media data. Media section 302 may comprise one or more media frames. As an example, FIG. 3 depicts two audio frames 303 and 305. The hub device 201 encapsulates one or more media frames and control data in the broadcast packet 300.

Packet 300 is broadcasted by the hub device 201. Any remote device 202 that is within range of the broadcast may receive the broadcasted packet. As each remote 202 receives the same broadcasted packet, the same media frames can be played back by each of the remote devices 202. Preferably, the hub device 201 is configured to broadcast packet 300 in accordance with the connectionless slave broadcast (CSB) mode of the Bluetooth Core Specification Addendum 4. Preferably, each remote device 202 is configured to receive CSB broadcasts.

The Connectionless Slave Broadcast mode is a feature of Bluetooth which enables a Bluetooth piconet master to broadcast data to any number of slave devices. This is different to normal Bluetooth operations, in which a piconet is limited to eight devices: a master and seven slaves. In the CSB mode, the master device reserves a specific logical transport for transmitting broadcast data. That broadcast data is transmitted in accordance with a timing and frequency schedule. The master transmits a synchronisation train comprising this timing and frequency schedule on a Synchronisation Scan Channel. In order to receive the broadcasts, a slave device first implements a synchronisation procedure. In this synchronisation procedure, the slave listens to the Synchronisation Scan Channel in order to receive the synchronisation train from the master. This enables it to determine the Bluetooth clock of the master and the timing and frequency schedule of the broadcast packets. The slave synchronises its Bluetooth clock to that of the master for the purposes of receiving the CSB. The slave device may then stop listening for synchronisation train packets. The slave opens it's receive window according to the timing and frequency schedule determined from the synchronisation procedure in order to receive the CSB broadcasts from the master device.

CSB may be considered to be unreliable as devices receiving a broadcast may not be able to acknowledge receipt of the packets sent in the broadcast or request a retransmission of packets as CSB is unidirectional.

Difficulties arise when attempting to synchronise the playback of media at the remote devices 202 and, if provided, the media output device of the hub device 201. For example, the remote devices 202 may not all receive the broadcasted packets at the same time. This may be the case when some of the devices 202 are not within direct communications range of the hub device 201 and the broadcasted packet arrive at those devices 202 via another device (e.g. a repeater, mesh node, etc.) that retransmits the broadcasted packet. Furthermore, different remote devices 202 may have different buffer and processing capabilities and so even if the broadcasted packets were received at the devices 202 at the same time, the media in those packets may not be processed for playback at the same time. This can cause each of the devices 202 (and device 201) to play out the media at different times.

Each media frame provided in the broadcast packet 300 is associated with data which represents a time for playing out that frame. This time to play (TTP) data may, for example, be provided in a header of the media frame. This is illustrated in FIG. 3 where the media section 302 comprises two audio frames, each of which having TTP data 304 and 306 in its header and respective audio data in its payload 303 and 305. The hub device 201 determines a TTP for each media frame, which indicates a time at which that the media data in the media frame should be played out.

Broadly, the TTP of a media frame is calculated with an offset time period that delays the play out of media. The offset provides time for received media to be processed at hub device, transported to the remote devices and processed at each remote device. As discussed below, the offset increases the probability that the all of devices in the system 200 play out media in synchronisation.

The TTP data may represent an absolute time that is derived from the Bluetooth clock (e.g. clock 16) of the hub device 201. Each remote device 202 may synchronise its Bluetooth clock (e.g. clock 16) to the hub device 201 Bluetooth clock. As each remote device 202 receives the same broadcast packet 300, each media frame can be played synchronously at the time indicated by the TTP.

Figure 4:
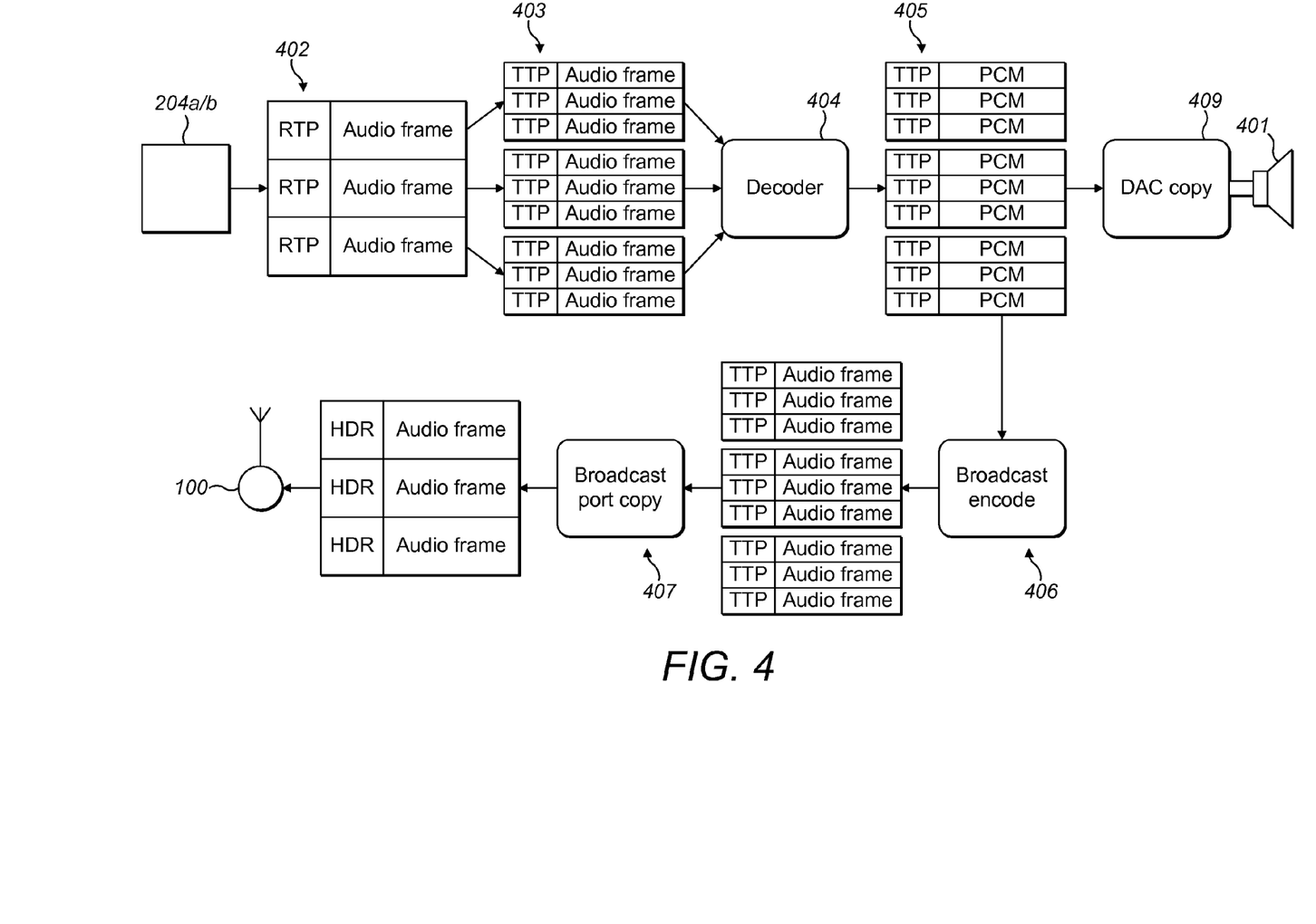
FIG. 4 illustrates a process for playing and broadcasting media frames with time data.

FIG. 4 shows an example process for adding TTP data to media frames at a hub device 201 for broadcasting to the remote devices. In this example, the hub device may also retain a local copy of the media data, and may play it out locally at the specified TTP. Thus, both the hub device and the remote devices play out the media together at the TTP. In other examples, the hub device may not comprise an output device for the media, in which case it does not retain a local copy. In FIG. 4, audio frames are used as examples of media frames and a speaker 401 is used as an example of an output device at the hub device. As mentioned above, other types of media and media output devices may be used.

At 402, audio frames are received from one of the inputs 204a or 204b. Based on the sample or sequence number of the incoming audio frame, the current clock time and an offset time, a TTP for each frame is calculated (discussed further below) and associated with each frame, as depicted at 403. The offset time is selected based on which one of the inputs 204a or 204b the audio frames are being received from. At 404, the audio frames are decoded into pulse code modulation (PCM) audio frames by a decoder. At 405, each audio frame and the TTP for that frame is stored in a store. The store may be a first in, first out (FIFO) buffer. The decoded frames may be stored in TTP order. The TTP of a frame may additionally serve as a sequence number for that frame.

The hub device 201 may convert media from one format to another format that is suitable for broadcasting to the remote devices 202. For example, the bandwidth for a broadcast may be limited and so a suitable codec may be selected that encodes and compresses media so that it is able to broadcast the media within the available bandwidth at a required level of quality and handles lost frames gracefully. As mentioned below, the hub device may operate with a retransmission mechanism where the same packets are broadcasted multiple times. In this case the effective available bandwidth may be reduced. Preferably, a suitable codec provides low coupling between frames, a low bitrate and packet loss concealment. An example of a suitable codec is Constrained Energy Lapped Transform (CELT) or Opus. Other suitable codecs may be used.

The encoder at 406 receives the PCM audio (which has a high bitrate) and encodes that PCM audio to a lower bitrate. The audio may be encoded into a series of frames, which may be of fixed or variable size. The audio data may be compressed. In a case where the hub device receives media in a codec that is suitable for broadcasting at one of its inputs, the re-encoding steps for broadcasting (step 406) may not be required.

At 407, the audio frames are encapsulated into broadcast packets 300 at 407 and broadcast by the wireless communication device 100. For example, the broadcast packets may be broadcast at a rate of ~100 kbps. As shown in the figure, the TTP data calculated for each frame at 403 is maintained for that frame throughout the subsequent steps.

Any processing of the audio frames must maintain the TTP. In particular if the processing operates on a different frame size, new TTP values must be calculated for the processed frames. A specific example could include the encoder which may generate audio frames of a different size to the un-encoded frames. Furthermore, these frames may not align with the un-encoded frames.

Each input 204a and 204b may receive data at different rates and have different burstiness. For example, a USB input may be less bursty than a Bluetooth input. An input that is bursty generally receives relatively large amounts of data over short periods of time and low amounts or no data the rest of the time. The buffer at the hub device generally outputs frames at a substantially constant rate to the speaker 402 (i.e. the playback rate of the media, which is preferably constant). Furthermore, the frames output to the encoder for broadcasting may be output at a relatively constant rate. During each burst, the rate at which frames are received may be much greater than the rate at which frames are output from the buffer. However, the amount of time until the next burst may be significant such that the frames in the buffer may have all been output before the next input data burst. Thus, there may not be any more frames available for playing out and broadcasting and so undesirable gaps and pauses can occur in the playback.

The hub device 201 comprises a controller 205 which determines an offset period of time to be used when calculating the TTP for each frame. The offset is determined in dependence on which one of the inputs 204a or 204b the media is being received from. Preferably, the offset is determined based on the burstiness of the input. If the input is bursty, then a longer offset time may be used. This increases the probability of media frames being received in time for them to be played out and broadcasted in a timely manner. If the input is less bursty, then a shorter offset time may be used as the probability of frames not being received on time is reduced. Furthermore, it may be desirable to minimise the delay in playing out media for a better user experience.

The offset period may be a predetermined time period for each input. For example, if the audio is received via A2DP, then the offset time may be about 150-350 ms. If the audio is received via USB, then the offset time may be about 90 ms.

The total offset period may be calculated to account for one or more of the following factors: burstiness of the input; time for processing frames (e.g. calculating TTP, decoding, encoding, media enhancement, etc.) for playback at the hub device; time for processing (e.g. encoding, encapsulating, etc.) frames for broadcast; estimated time for broadcasting (e.g. waiting for a transmit slot time); estimated time of receiving and processing the frames for playback at a remote device (e.g. direct or indirect transport of the broadcast packet, decoding, media enhancement, etc.).

For media to be played out at the correct rate, the output sample rate should match the incoming sample rate. As the media sources providing media to inputs 204a/b may have a different clock to the hub device 201 there may be an error between the output and incoming sample rate. If the TTP were calculated based on the local clock and therefore the output rate, the error causes buffer overruns and underruns. Therefore the TTP calculation may factor in the estimate of the input sample rate.

Preferably, the TTP is calculated using the following algorithm:

$$TTP[0]=TIME\_NOW+TOTAL\_OFFSET\_PERIOD$$

$$TTP[n]=TTP[n-1]+(m\_samples\_in\_frame*sample\_period\_estimate)$$

$$ERROR[n]=TTP[n]-(TIME\_NOW+TOTAL\_OFFSET\_PERIOD)$$

Where TIME_NOW is the current value of clock 16 at the wireless communication device 100, TOTAL_OFFSET_PERIOD is the determined offset for the input 204a or 204b, n is the frame number, m_samples_in_frame is the number in samples in frame n, and sample_period_estimate is an estimate of the media source's sample period with respect to the hub device's clock 16.

The sample_period_estimate is calculated so as to minimise ERROR. The sample_period_estimate is adjusted at a rate slow enough that it is not heard by the user.

Due to the bursty nature of some input sources, at the start of the stream, ERROR may be significant. The ERROR may be reduced by adjusting all the stored TTPs by ERROR. The adjustment is made before the frames are broadcast.

Other suitable algorithms with an offset period that is dependent on the input may be used to calculate and adjust the TTP.

Preferably, the offset period is constant for a particular input 204a/b. The hub device may have a default offset period for each input. However, the offset period for each input can also be adjusted to account for changes in system. For example, if it takes the broadcasted packets a longer time to reach some remote devices (e.g. because the packet is being relayed) then the offset period for the input being used may be increased to maintain synchronisation with those remote devices. In another example, if the media is required to be streamed at a higher bitrate (e.g. for higher quality video or audio), then the offset period for an input may be increased as the transmission bandwidth may be limited. In yet another example, where low latency of the media output is important for a particular application (e.g. a teleconference, VoIP, etc.), then the offset period for an input may be reduced. The offset period may be adjusted in response to a user input or automatically by the hub device in response to the particular media application in use.

In conventional wireless multi-speaker systems, a direct connection is usually provided between each speaker and a central controller (such as a hub or central speaker). Each connection is used to communicate data (such as audio data and control data) between the central controller and speaker. Control functions (e.g. pausing, volume control, etc.) are usually achieved by providing a dedicated control channel or packets for each speaker connection. The audio data is conventionally sent in a different channel or packets. In some cases where the wireless connection is lossy or suffers from interference, some control packets or audio packets may not be received by all of the speakers. This may lead to the audio and the control of that audio to be out of sync for some or all of the speakers. The control data section 302 may comprise control data for the audio frames in the audio section 302 of the packet 300. For example, the control data section 302 of each packet 300 may comprise volume control data for the audio frames contained in the audio section 302 of that packet. Other control data for the audio frames may be included in section 301 such as commands (e.g. play, pause, stop, etc.), playback rates, equalization data, etc. A remote device may carry out the actions arising from the control data at the time indicated by the TTP 305 and 306. As each remote device 202 receives the same broadcasted packet, the actions arising from the control data can be carried out for each frame by each of the devices 202 at the same time.

As mentioned above, the hub device preferably broadcasts packets using the CSB mode of Bluetooth. CSB is a uni-directional link. In other words, the remote devices 202 are not able to respond to the hub device 201 using the CSB link. Thus, the remote devices 202 are not able to send, via the CSB link, acknowledgment messages to the hub device 201 to confirm receipt of the broadcast packets. Similarly, the remote device 202 are not able to send, via the CSB link, retransmission requests if they receive a corrupted broadcast packet or fail to receive a packet (which may be indicated by a time gap in the received TTP data). If a remote device receives a corrupted packet or does not receive a packet, it may perform packet loss concealment to limit the degradation to the signal. Alternatively, the remote device may repeat the last media frame until a later correctly received media frame is available to play out. As a further alternative, the remote device may play out silence for the timespan of the missing packet. Since the hub device 201 does not receive acknowledgement messages from the remote devices 202, it does not know whether the remote devices 202 have correctly received the broadcast packets. The hub device may implement a retransmission mechanism, in which it retransmits media frames (and associated TTP data) in order to increase the likelihood of the remote devices correctly receiving the packets. Thus a remote device may receive multiple packets having frames with the same TTP. If the remote device receives a frame with a TTP that has been previously received, then the remote device may be configured to discard that received frame. Alternatively, if the previously received frame has been damaged, the recently received frame with the same TTP may replace the damaged frame if it is undamaged. If the recently received frame is also damaged, the remote device may be configured to reconstruct the frame using the two (or more, if more are received) damaged frames. Similarly, a damaged packet may be reconstructed using one or more other damaged packets.

New remote devices 202 may enter or leave the system 200 whilst the hub device 201 is broadcasting without affecting that broadcast. As the broadcast is unidirectional, the hub device 201 is unaffected by the devices 202 that receive its broadcast. Thus, remote devices 202 can easily and simply be added or removed to or from the system 200 without the need to reconfigure the hub device 201.

Figure 5:
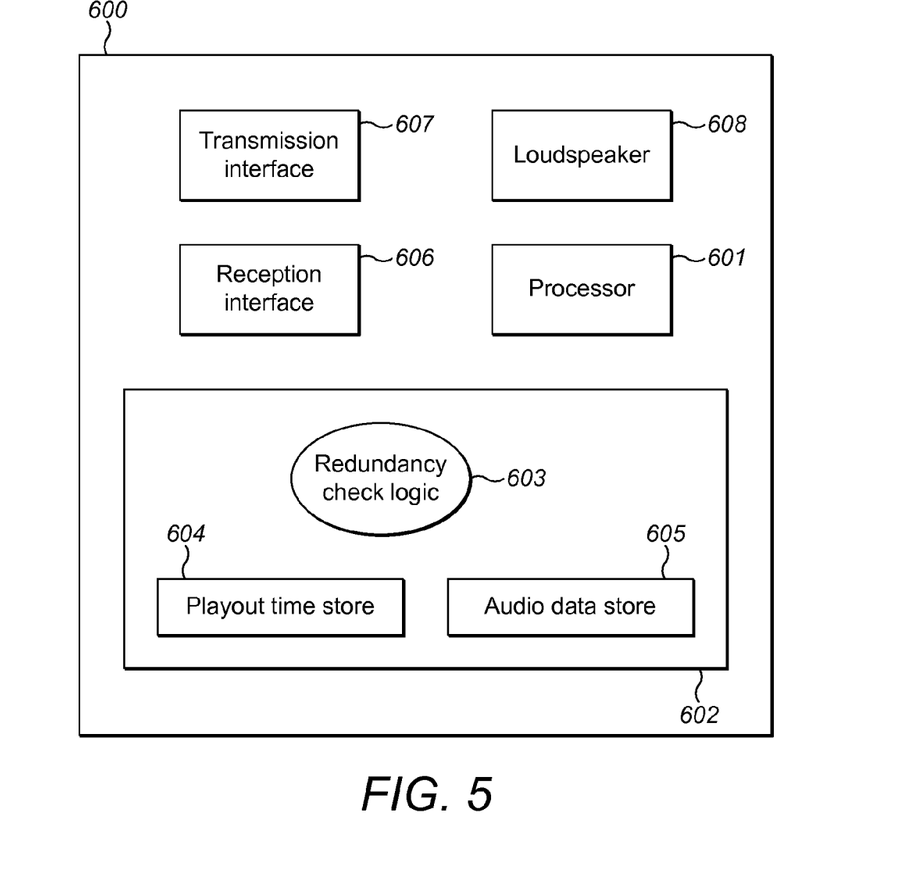
FIG. 5 illustrates a computing device.

Reference is now made to FIG. 5. FIG. 5 illustrates a computing-based device 600 in which the described remote device can be implemented. The computing-based device may be an electronic device. The computing-based device illustrates functionality used for storing the media data and playout time of received frames, and for playing out the media data of the received frames.

Computing-based device 600 comprises a processor 601 for processing computer executable instructions configured to control the operation of the device in order to perform the synchronous playback of received media. The computer executable instructions can be provided using any non-transient computer-readable media such as memory 602. Further software that can be provided at the computer-based device 600 includes redundancy check logic 603 which extracts the playout time from the media frame and checks if a frame with the same playout time has been received previously, as mentioned above. Alternatively, the redundancy check may be implemented partially or wholly in hardware. Store 604 stores the playout times, TTP, of media frames. Store 605 stores the media data of the media frames. Computing-based device 600 further comprises a reception interface 606 for receiving the broadcast audio from the hub device. The receiver may be the wireless communication device 100 described above, which includes a clock. The computing-based device 600 may additionally include transmission interface 607. The computing-based device 600 also comprises a media output such as loudspeaker 608 for playing the audio out locally at the play out time.

The structure shown in FIGS. 1 and 5 are intended to correspond to a number of functional blocks in an apparatus. This is for illustrative purposes only. FIGS. 1 and 5 is not intended to define a strict division between different parts of hardware on a chip or between different programs, procedures or functions in software. In some embodiments, some or all of the algorithms described herein may be performed wholly or partly in hardware. In other implementations, the algorithms may be implemented by a processor acting under software control. Any such software is preferably stored on a non-transient computer readable medium, such as a memory (RAM, cache, hard disk etc.) or other storage means (USB stick, CD, disk etc.).

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:
1. A device capable of operating according to a wireless communications protocol, the device being configured to:
    receive media data from one of a plurality of inputs;
    determine an offset period of time based on which input of the plurality of inputs the media data is received from, wherein the offset period of time is determined based on a predetermined period of time having a duration that compensates for reception delays between bursts of media data associated with the input;
    determine a time for playing the received media data based on the determined offset period and a clock value;
    encapsulate the media data and time data representing the determined time for playing in a broadcast packet; and
    broadcast the broadcast packet in accordance with the wireless communications protocol to one or more remote devices configured to play out the media data at the determined time for playing.

2. The device of claim 1, wherein the plurality of inputs comprise a first input and a second input, wherein the determined offset period is a first time period if the media data is received from the first input and the determine offset period is a second time period if the media data is received from the second input, the first time period being different to the second time period.

3. The device of claim 2, wherein the first input is burstier than the second input and the first time period is greater than the second time period.

4. The device of claim 1, wherein the time for playing is determined based on a sample rate at which media data is received.

5. The device of claim 1, wherein the offset period of time is determined based on a first estimated period of time for processing the media data for playback and a second estimated period of time for processing the media data for broadcasting.

6. The device of claim 5, wherein the offset period of time is determined further based on a third estimated period of time for receiving the broadcasted packet at another device and a fourth estimated period of time for processing the received packet for playing back the media data.

7. The device of claim 1, wherein a sequence number for the media data is represented by the time data.

8. The device of claim 1, wherein the received media is encoded according to a first codec, the device being further configured to:
decode the received media data;
temporarily store the decoded media data and the time data in a buffer;
encode the stored media data according to a second codec different to the first codec, wherein the encapsulated media data is the encoded media data; and
play the stored decoded media data at the determined time for playing.

9. The device of claim 1, wherein the device comprises a playback device configured to play the media data at the time indicated by the time data.

10. The device of claim 1, wherein the broadcast is unidirectional.

11. The device of claim 1, wherein the wireless communications protocol mandates that the one or more remote devices receiving broadcasted packets do not send acknowledgement messages to confirm receipt of the broadcasted packets.

12. The device of claim 1, wherein the wireless communications protocol is Bluetooth.

13. The device of claim 12, wherein the broadcast is a connectionless slave broadcast.

14. The device of claim 12, wherein the media data is received via an A2DP link of the Bluetooth communications protocol.

15. The device of claim 1, wherein device is further configured to encapsulate control data in the broadcast packet, wherein the control data is configured to cause the one or more remote devices to perform a control function at a time indicated by the time data.

16. A device capable of operating according to a wireless communications protocol, the device being configured to:
receive a broadcast packet broadcasted in accordance with the wireless communications protocol from a hub device, wherein the broadcast packet comprises media data and time data, the time data representing a time for playing the media data at the device that is based on an offset period of time, and wherein the offset period of time is based on a predetermined period of time having a duration that compensates for reception delays between bursts of media data associated with an input from which the media data is received at the hub device;
decode the media data;
determine the time for playing the decoded media data based on the time data and a clock; and
play the decoded media data at the determined time for playing.

17. The device of claim 16, wherein the broadcast packet is received from the hub device using a link defined by the wireless communication protocol, the device being configured to not transmit packets to the hub device using the link.

18. A method of broadcasting a stream of packets comprising:
receiving a stream of media frames from one of a plurality of inputs;
determining an offset period of time based on which one of the plurality of inputs the media frames are received from, wherein the offset period of time is determined based on a predetermined period of time having a duration that compensates for reception delays between bursts of media data associated with the input;
determining a time for playing each of the received media frames based on the determined offset period and a clock;
broadcasting a stream of packets comprising the media frames and the determined time for playing for each media frame in accordance with a wireless communications protocol to one or more remote devices configured to play out each media frame at the determined time for playing the media frame.

19. The method of claim 18, wherein the wireless communications protocol is a Bluetooth protocol and the stream is broadcast in the connectionless slave broadcast mode of the Bluetooth protocol.

20. A communications device capable of operating according to a wireless communications protocol, the device being configured to:
receive media from an input;
estimate a period of time for the media to be received by one or more remote devices from the communication device, wherein the period of time is estimated based on a predetermined period of time having a duration that compensates for reception delays between bursts of media data associated with the input;
determine a play out time for playing out the media based on the estimated period and a clock value;
encapsulate the media and the play out time in a broadcast packet; and
broadcast the broadcast packet in accordance with the wireless communications protocol to the one or more remote devices configured to play out the media at the determined play out time.

21. The communications device of claim 20, wherein the period of time is estimated based on an amount of time for a packet to be transported from the communications device to the one or more remote devices.

22. The communications device of claim 20, wherein the period of time is estimated based on a number of times a packet is relayed for transporting that packet from the communications device to the one or more remote devices.

23. The communications device of claim 20, wherein the period of time is estimated based on whether or not the one or more remote devices is within direct communications range of the communications device.

24. The communications device of claim 20, wherein the period of time is estimated on the quality of the media.

25. The communications device of claim 20, wherein the period of time is estimated based on the bitrate of the media.

26. The communications device of claim 20, wherein the period of time is estimated based on a media type of the media.

27. The communications device of claim 20, wherein the period of time is estimated based on a latency for playing the media.

28. The communications device of claim 20, wherein the communications device is configured to: estimate a second period of time for the media to be received by the one or more remote devices from the communication device; and determine which of the estimated periods of time is the longest, the playout time being determined based on the longest estimated period of time.

29. A method of broadcasting a stream of packets from a communications device comprising:
   receiving media from an input of the communications device;
   estimating a period of time for the media to be received by one or more remote devices from the communication device;
   determining a play out time for playing out the media based on the estimated period and a clock value, wherein the period of time is estimated based on a predetermined period of time having a duration that compensates for reception delays between bursts of media data associated with the input of the communication device;
   encapsulating the media and the play out time in a broadcast packet; and
   broadcasting the broadcast packet to the one or more remote devices configured to play out the media at the determined play out time.

* * * * *